United States Patent Office 2,913,438
Patented Nov. 17, 1959

2,913,438

COPOLYMERS OF ACRYLONITRILE AND ALKENYLAROMATIC SULFONATES, AND DYEABLE FIBERS THEREOF

Clyde W. Davis, Antioch, Forrest A. Ehlers, Walnut Creek, and Teddy G. Traylor, Concord, Calif., assignors to The Dow Chemical Company, Midland, Mich., a corporation of Delaware No Drawing. Application October 31, 1955
Serial No. 544,071

2 Claims. (Cl. 260—79.3)

This invention relates to certain new linear, fiber-forming arcylonitrile copolymers, and to the dyeable fibers made therefrom. It relates in particular to copolymers made from a monomeric mixture of a minor amount of a particular class of alkenylaromatic sulfonate and a major amount of acrylonitrile or a mixture of acrylonitrile and monounsaturated monomers which form linear copolymers with acrylonitrile.

The so-called acrylic fibers, made from polyacrylonitrile or from copolymers of generally 85 percent or more of acrylonitrile with any of numerous well-known monounsaturated monomers, have gained commercial prominence in the past several years. Despite their numerous favorable properties, these fibers have had a serious disadvantage in that most of them are difficult to dye by known procedures with the common types of dyes. Various expedients have been proposed to overcome this difficulty, but the problem still exists and new means are needed to overcome it.

According to the present invention, acrylic fibers which are readily dyeable with acetate, basic and vat dyes are made from new copolymers obtained from a monomeric mixture of (1) a soluble compoud having the general formula

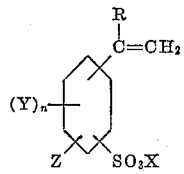

wherein R is methyl or hydrogen; X is hydrogen, metal or ammonium; Y is chlorine or bromine, and $n$ is 0, 1 or 2; and Z is hydrogen, methyl or ethyl; and (2) a monomeric material from the class consisting of acrylonitrile and mixtures of at least 86 percent acrylonitrile with monoethylenically unsaturated monomers copolymerizable with acrylonitrile to produce linear copolymers. The copolymers contain from 1 to 10 percent of the sulfonic compounds, by weight, even when the monomeric mixture from which it is made contains higher proportions, up to 25 percent, or more, of the sulfonate.

The alkenylaromatic sulfonates useful in the invention must be substantially soluble in the medium that is chosen for polymerization. Examples of the useful sulfonates include styrene sulfonic acid, vinyl toluene sulfonic acid, vinyl ethylbenzene sulfonic acid, isopropenyl benzene sulfonic acid, isopropenyl toluene sulfonic acid, isopropenyl ethylbenzene sulfonic acid, 2-chlorostyrene sulfonic acid, 2,4-dichlorostyrene sulfonic acid, 2-methyl-4-chlorostyrene sulfonic acid, 2-chloro-4-ethyl styrene sulfonic acid, 2,4-dichloro-6-methyl styrene sulfonic acid, 2-chloro-isopropenyl benzene sulfonic acid, and the sodium, potassium, lithium, calcium, magnesium, and ammonium salts of such acids.

Examples of other monoethylenically unsaturated monomers which are known to copolymerize with acrylonitrile to form linear, fiber-forming copolymers are found throughout the voluminous art in this field. They include, purely by way of illustration and not of limitation, such monomers as vinyl acetate, vinyl butyrate, methyl acrylate, ethyl acrylate, 2-ethylhexyl acrylate, butyl methacrylate, the vinyl pyridines, acylaminostyrenes, acrylamide, alkyl itaconates, methallyl alcohol, allylamine, vinyl chloride, vinylidene chloride, styrene and similar monounsaturates.

The copolymers of the invention may be made by conventional procedures. It is convenient to introduce the monomers, in the desired ratio, together with a conventional polymerization catalyst, into an aqueous solution of about 60 percent concentration of zinc chloride, or of calcium thiocyanate, or other highly hydrated salt whose solution dissolves both the monomers and the copolymers, and to heat the resulting mixture at from 40° to 60° C. When so-prepared, the resulting solution may be used directly for spinning filaments of the copolymer. When the copolymer is made in other ways, it may be recovered from the polymerization system and dissolved in any of the well-known solvents for high acrylonitrile copolymers, and spun from such solution.

Filamentary or fibrous forms of the new copolymers are readily dyed, using standard procedures, with acetate, acid, basic or vat dyes. They take the dyes uniformly throughout their structure, and in a satisfactory shade and intensity, whenever the copolymer contains at least 1 percent of the vinylaromatic sulfonate. The preferred concentration of the sulfonate in the copolymer is from two to seven percent. No advantage is found in having over 10 percent of the sulfonate present.

The following examples illustrate the invention:

Example 1

Acrylonitrile and sodium p-styrene sulfonate were copolymerized in each of several ratios, by dissolving the mixture of monomers in 60 percent aqueous zinc chloride, together with 1 percent of potassium persulfate. The solution was heated to 50° C. and held at this temperature for several hours. Polymerization was from 90 to 99 percent complete in 6 hours. The resulting solution was extruded through spinneret orifices into an aqueous coagulant at 15° C. The coagulated filaments were washed free from zinc chloride, stretched in wet steam, and dried. Samples of the filaments were analyzed, with the following results.

| Sample | Weight percent styrene sulfonate calculated as sulfonic acid | |
|---|---|---|
| | In monomer charge | In copolymer |
| A | 1.4 | 1.2 |
| B | 2.9 | 1.8 |
| C | 5.9 | 4.7 |
| D | 7.2 | 6.3 |

Other samples of each of the filamentary copolymer products were dyed with 2.0 percent of Amacel Scarlet BS (an acetate dye), based on the weight of fiber, using standard procedures for such dyes. The color yield, expressed in Judd units from white, was determined on each sample. The dyed samples were then subjected to Washfastness Test No. 3A of the American Association of Textile Colorists and Chemists, and the color ratings were determined again. In like manner, samples were dyed using 2 percent, based on the weight of fiber, of Brilliant Green Crystals (a basic dye) and others using 20 percent, based on the weight of fiber, of Sulfanthrene Red (a vat dye) and similar tests were made. For comparison, corresponding values are given for polyacrylonitrile (PVCN) filaments made by the same procedure.

| Sample | Color yield, Judd units from White | | | | | |
|---|---|---|---|---|---|---|
| | From dye bath | | | After Washfastness Test | | |
| | Acetate | Basic | Vat | Acetate | Basic | Vat |
| A | 45 | 56 | 40 | 35 | 46 | 40 |
| B | 52 | 64 | 54 | 50 | 59 | 46 |
| C | 71 | 75 | 67 | 53 | 75 | 62 |
| D | 75 | 69 | 78 | | 60 | 77 |
| PVCN | 37 | 38 | 0 | 5 | 10 | 0 |

Each of the dyed samples of the new copolymer was found, on further test, to be crockfast and lightfast. The filaments had excellent strength and elongation characteristics, having strengths of the order of 3 grams per denier and being capable of from 15 to 25 percent elongation.

*Example 2*

The procedures and tests of example 1 were repeated using the sodium salt of vinyl toluene sulfonic acid instead of styrene sulfonic acid. Copolymers were made with from 5.2 to 6.6 percent of the sulfonic compound. Here again the fibers were useful for textile purposes and were readily dyed with acetate, basic and vat dyes to give washfast, crockfast and lightfast products.

*Example 3*

The potassium salt of ortho-chlorostyrene sulfonic acid was substituted for the styrene sulfonic acid of Example 1, and copolymers were made with about 6.2 percent of the sulfonic compound from monomer mixtures containing about 6.5 percent of the sulfonate. These copolymers were spun into fine filaments in the manner described, and the filamentary products were readily dyeable with acetate dyes and basic dyes, which were the only types tried on these filaments.

*Example 4*

A ternary mixture of monomers consisting of 89.6 percent by weight of acrylonitrile, 4.1 percent of dimethylaminoethyl acrylate and 6.3 percent of p-styrene sulfonic acid was dissolved to form a 10 percent solution in 60 percent aqueous zinc chloride. There was added a catalytic amount of hydrogen peroxide and the mixture was held at 50° C. until polymerization was about 80 percent complete. The resulting copolymer solution was spun into fibers in the described manner, and the fibrous product was dried at 105° C. Samples of the fibers were dyed with acetate, acid, basic and vat dyes. All of the samples were dyed through, and had a good color yield.

The copolymers of the invention are all linear and fiber-forming, and the filamentary or fibrous products have strength and elongation values which compare favorably with those of the commercial polymer and copolymers of acrylonitrile. They are useful in the manufacture of woven and knit goods and their ready acceptance of a variety of dyes recommends them where many of the prior acrylic fibers cannot be used.

We claim:

1. A linear fiber forming copolymer made from a copolymerizable mixture, the sole monomeric constituents of which are sodium para-styrene sulfonate and acrylonitrile, in which monomer mixture there is from 6.5 to 10 percent of the said sulfonate based on the combined weights of the sulfonate and acrylonitrile; the said copolymer containing at least one percent by weight of the said styrene sulfonate chemically combined in the copolymer molecule, calculated as para styrene sulfonic acid.

2. An oriented filament of a copolymer claimed in claim 1, characterized by ready dyeability with acetate, basic and vat dyes.

References Cited in the file of this patent

UNITED STATES PATENTS

| 2,527,300 | Dudley | Oct. 24, 1950 |
| 2,618,655 | Dickey et al. | Nov. 18, 1952 |
| 2,837,500 | Andres et al. | June 3, 1958 |
| 2,837,501 | Millheiser et al. | June 3, 1958 |

FOREIGN PATENTS

| 1,106,816 | France | July 27, 1955 |